Figure 1:
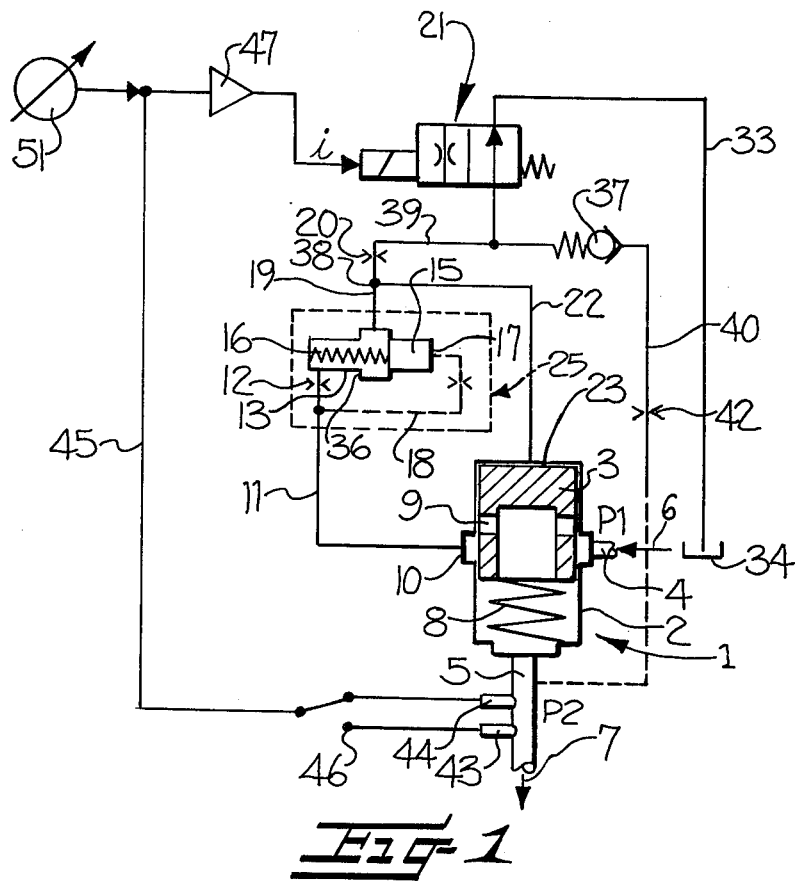

United States Patent [19]

Schwelm

[11] Patent Number: 4,476,893
[45] Date of Patent: Oct. 16, 1984

[54] HYDRAULIC FLOW CONTROL VALVE

[75] Inventor: Hans Schwelm, Kaarst, Fed. Rep. of Germany

[73] Assignee: Barmag Barmer Maschinenfabrik AG, Remscheid, Fed. Rep. of Germany

[21] Appl. No.: 279,780

[22] Filed: Jul. 2, 1981

[30] Foreign Application Priority Data

Jul. 4, 1980 [DE] Fed. Rep. of Germany ....... 3025315
Dec. 16, 1980 [DE] Fed. Rep. of Germany ....... 3047244

[51] Int. Cl.³ ........................................... F16K 31/122
[52] U.S. Cl. .................................. 137/486; 137/487.5; 251/30
[58] Field of Search .................... 137/487.5, 489, 492, 137/492.5, 486; 251/30

[56] References Cited

U.S. PATENT DOCUMENTS

| | | | |
|---|---|---|---|
| 3,103,950 | 9/1963 | Gulick | 137/538 X |
| 3,113,582 | 12/1963 | Hudson | 137/489 X |
| 3,246,669 | 4/1966 | Adams | 137/501 |
| 3,369,561 | 2/1968 | Zimmerman | 137/487.5 X |
| 3,769,998 | 11/1973 | Avant | 137/489 X |
| 4,000,754 | 1/1977 | Risk | 137/489 X |
| 4,138,087 | 2/1979 | Kruse | 137/489 X |

FOREIGN PATENT DOCUMENTS 1168735 10/1969 United Kingdom .
1288525 9/1972 United Kingdom .
1369115 10/1974 United Kingdom .
2036382 6/1978 United Kingdom .

Primary Examiner—Alan Cohan
Attorney, Agent, or Firm—Bell, Seltzer, Park & Gibson

[57] ABSTRACT

A hydraulic flow control valve is disclosed which is adapted for use as a pressure reducing valve, a flow control valve, or as a pressure relief valve. The valve includes a choke piston slidably mounted in a cylindrical bore for movement between a closed position closing communication between inlet and outlet channels, and an open position permitting such communication. An adjustable control system is provided for biasing the piston toward one of either its closed or open positions, and includes a constant volume flow restriction valve for providing a constant volume hydraulic flow. Downstream of the constant volume flow valve, there is provided a first branch line leading to an adjustable transducer for maintaining a selected pressure in the line, and a second parallel branch line leading to the bore in the housing for biasing the piston. Thus a selected pressure may be maintained in the second line, and thus also upon the piston, by adjustment of the transducer.

17 Claims, 4 Drawing Figures

HYDRAULIC FLOW CONTROL VALVE

The present invention relates to a hydraulic flow control valve, which is adapted for use as a pressure reducing valve, a flow control valve, or as a pressure relief valve.

Known pilot valves for controlling the pressure, or the flow rate, in large volume hydraulic systems of the type having a flow rate of several thousand liters per minute and a pressure as high as about 350 bars, and which depend on an input of low power, utilize multi-stage servo systems. The purpose of these systems is to substantially eliminate the influence of any disturbance variables which may be detected as a result of the low input power.

It is an object of the present invention to provide a hydraulic flow control valve of the described type, and which has a simplified control system.

It is a more particular object of this invention to provide a hydraulic flow control valve which has the characteristics of a conventional multi-stage pilot valve, but which is of a relatively simple two-stage design.

These and other objects and advantages of the present invention are achieved in the illustrated embodiments by the provision of a hydraulic flow control valve which consists of a hydraulically adjustable two-way valve with an electrically controllable, electro-hydraulic transducer as the amplifier stage, and by which the piston of the two-way valve is charged hydraulically on its control end with a controlled pressure. The hydraulic valve is further characterized in that the hydraulic amplifier stage of the electro-hydraulic transducer and the control end of the two-way valve are connected in respective parallel lines from a common pressure channel, and that a volume flow restriction valve is positioned in the common pressure channel upstream of the juncture leading to the two parallel lines.

The control system consisting of the electro-hydraulic transducer and the two-way valve exhibits the features of pilot valves at high hydraulic powers which are to be controlled, and it may also be used for different purposes. The advantages of the present control system result in particular from the fact that the hydraulic flow supplied to the amplifier stage is independent of the system pressure.

The hydraulic valve according to the present invention may be used as a pressure reducing valve, a flow control valve, and a pressure relief valve at high hydraulic powers, i.e., at a high flow rate and high pressure, the control being effected by means of the input current to the electro-hydraulic transducer. This control system is preferably automatic, and includes a pressure sensor or a flow sensor, and a set value transmitter and automatic controller operatively connected to the sensor. The two-way valve is of a sliding design when functioning as a reducing valve or flow control valve. In the former case, the user pressure to be regulated constitutes the measured and controlled variable, and in the latter case, the user volume flow to be regulated constitutes the measured and controlled variable. For use as a pressure relief valve, the two-way valve is designed as a seat valve, and the system pressure P1 forms the measured and controlled variable.

Very effective control and regulation characteristics may be achieved when the electro-hydraulic transducer includes a torque motor which adjusts the spacing of a nozzle-baffle system. In this arrangement, the nozzle is preferably connected in a line having a damping choke, and which is downstream of the volume flow restriction valve. Such choke is effective to eliminate vibrations in the system, if necessary. For use as a pressure reducing valve or a flow control valve, a feedback to the nozzle from the user (i.e. outlet) channel provides the advantage that the amplifier stage functions even when there are low system pressures.

The volume flow restriction valve which is disclosed for use with the present invention comprises a pressure governor having a spring loaded piston which, on its spring end is charged with a pressure reduced by a choke system or an orifice plate. The piston is charged with an unreduced pressure, preferably the system pressure, on its end opposite the spring. This particular design of the pressure governor acts to reduce friction forces on the piston thereof.

Figure 2:
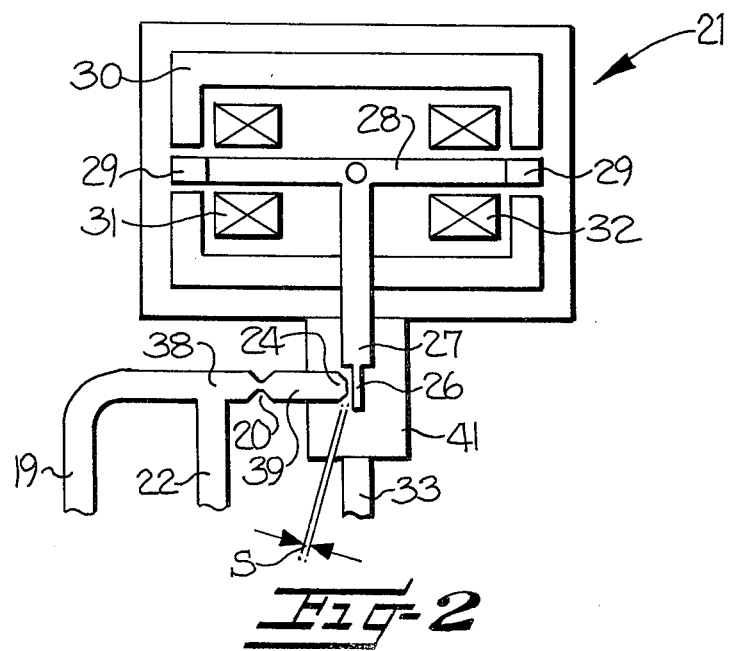
Figure 3:
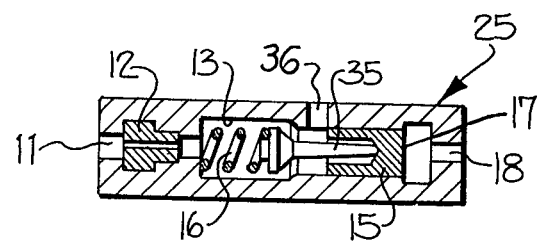
Figure 4:
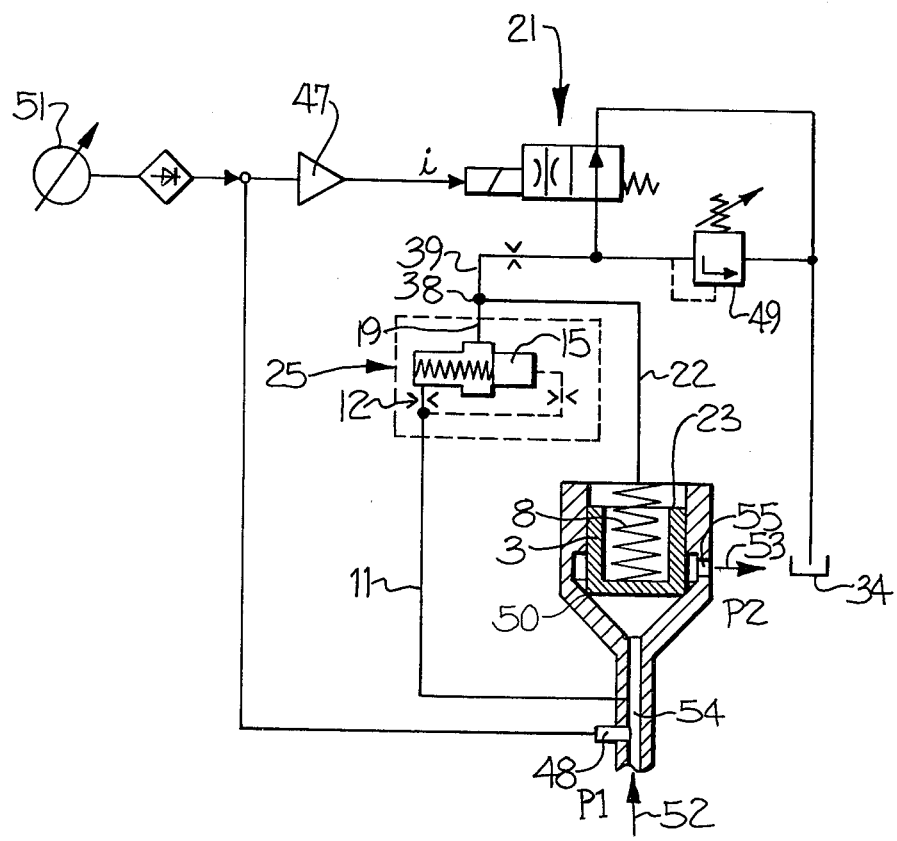

Some of the objects and advantages of the invention having been stated, others will appear as the description proceeds, when taken in connection with the accompanying drawings, in which FIG. 1 is a schematic circuit diagram of a hydraulic flow control valve in accordance with the present invention, and which is designed to function as a pressure reducing valve or a flow control valve;

FIG. 2 schematically illustrates the electro-hydraulic transducer utilized with the present invention;

FIG. 3 is a schematic sectional view of a volume flow restriction valve adapted for use with the present invention; and FIG. 4 is a schematic circuit diagram of a second embodiment of a hydraulic flow control valve in accordance with the present invention, and which is adapted to function as a pressure relief valve.

Referring more particularly to the drawings, a hydraulic flow control valve is illustrated schematically in FIG. 1, and comprises a two-way valve 1 as the main stage, and which includes a cylinder 2, a choke piston 3, a spring 8, an inlet channel 4, an annular channel 10 communicating with the inlet channel 4, and an outlet or user channel 5. The through flow direction is indicated by the arrows 6 and 7. The choke piston 3 is biased toward its closed position by the spring 8. In this closed position, the passages 9 in the piston 3 are closed to the annular channel 10. The system pressure P1 is applied in the inlet channel, and the pressure in the user channel 5 is indicated by the term P2.

The control stage 21 is supplied with control hydraulic fluid (e.g. oil) via the annular channel 10 and the channels 11, 19 and 39. A volume flow restriction valve 25 is positioned upstream of the control stage 21. The valve 25 is illustrated in FIG. 3, and includes a cylinder having a control piston 15 slidably mounted therein. Further, the valve 25 includes a metering orifice 12 at one end of the cylinder, and an opening for a line 18 at the other end of the cylinder. The interior of the cylinder includes a chamber 13 housing a spring 16, and a spike 35 which is interposed between the spring 16 and piston 15. The pointed end of the spike 35 contacts the piston at a single coaxial point, so that the piston is substantially free of shearing forces, to thereby insure that the piston slides very easily. The cylinder also includes an outlet opening 36 extending through the cylinder wall adjacent the end of the piston facing the chamber 13, with the opening 36 being connected to the line 19.

In operation, the chamber 13 and thus the adjacent end of the piston 15 is charged with the system pressure reduced by the orifice 12, and the end 17 of the piston is charged with the full system pressure. The edge of the opening 36 cooperates with the piston to form a control edge. The effect of this volume flow restriction valve is that the volume flow in lines 19 and 39 to the control stage 21 is maintained substantially constant, and independent of the control pressure and the system pressure P1. The volume flow may be restricted by a restriction valve of this type to, for example, about 600 ml/minute.

The outlet line 19 of the valve 25 leads to a juncture 38, which in turn leads to two parallel lines, namely, a first line 39 leading to the control stage 21 via a damping nozzle 20, and a second line 22 leading to the control pressure end 23 of the choke piston 3 of the two-way valve 1.

The control stage 21 which is schematically illustrated in FIG. 2, consists of a nozzle 24 at the end of line 39, and a baffle plate 26 which is connected to a balance arm 27, 28 of a torque motor. The balance arm 28 with its magnetic ends 29 is controlled electromagnetically via iron yokes 30 by electromagnets 31 and 32, such that a gap S is formed between the nozzle 24 and plate 26. The gap is dependent on the input current i (note FIG. 1). The drop in pressure and thus the control pressure in the line 19 and the line 22 is determined by the width of the gap. Thus, the position of the choke piston 3 may be accurately controlled via the input current i, i.e., by means of the set value transmitter 51 and controller amplifier 47. The nozzle 24 is positioned in a housing having an outlet 33 which leads to a reservoir 34.

The control system for the above described hydraulic valve may be used for several different functions, namely, as a pressure reducing valve and a flow control valve wherein the main stage is designed as illustrated in FIG. 1, and as a pressure relief valve wherein the main stage is designed as illustrated in FIG. 4. Referring more particularly to the embodiment of FIG. 4, the main stage is designed as a seat valve having a seat 50, and an inlet channel 54 and an outlet channel 53. The through flow direction is indicated by the arrows 52 and 53. It is noted that the electro-hydraulic transducer, the volume flow restriction valve, and the two-way valve correspond generally to the components illustrated and described above with reference to FIGS. 1, 2 and 3.

As noted above, the hydraulic valve according to FIG. 1 may be used as a pressure reducing valve and as a flow valve. For this purpose, a pressure sensor 43 and a flow sensor 44 may be positioned in the user or outlet channel 5. The output signal of one of these sensors is transmitted via the switch 46 through the feedback line 45 to the set value signal emitted from the transmitter 51. As a result, either the pressure or the flow may be regulated.

The channel 39 leading to the amplifier stage is connected to the user channel 5 via the oil return channel 40 in the embodiment illustrated in FIG. 1. A check valve 37 which is provided with a spring release, is positioned in the return channel 40 so as to have a through flow direction from the user channel 5 to the line 39. Thus, the return channel 40 assures that where there is a low system pressure P1 (for example, less than 20 bars), and at which the function of the volume flow control valve may no longer be insured, a control pressure is available in the line 39 and the line 22. The volume flow from the user channel to the control stage is restricted by a choke orifice 42 in the channel 40.

As noted above, the hydraulic valve illustrated in FIG. 4 is adapted to act as a pressure relief valve for the system pressure P1. For this purpose, a pressure sensor 48 may be positioned in the inlet channel 54, the output signal of which is transmitted to the set value transmitter 51 in an automatic control system. A pressure relief valve 49 may also be provided in the line 39 to insure against excessive pressure in the control stage.

In the drawings and specification, there has been set forth a preferred embodiment of the invention and although specific terms are employed, they are used in a generic and descriptive sense only and not for purposes of limitation.

That which is claimed is:

1. A hydraulic flow control valve comprising
a housing having a bore therein,
a hydraulic inlet channel and a hydraulic outlet channel, each communicating with said bore in said housing,
valve means mounted in said bore for movement between a closed position closing communication between said inlet and outlet channels, and an open position permitting such communication,
adjustable control means for biasing said valve means toward one of either its closed or open positions, and including,
 (a) constant volume flow restriction means for providing a constant volume hydraulic flow,
 (b) a first line connected downstream of said constant volume flow restriction means,
 (c) adjustable transducer means operatively connected to said first line for maintaining a selected pressure therein,
 (d) an outlet line leading from the downstream side of said transducer means to an external reservoir,
 (e) a second line connected downstream of said constant volume flow restriction means and parallel to said first line, said second line leading to said bore in said housing and so that the pressure in said second line is adapted to bias said valve means toward one of either its closed or open positions,
 (f) flow sensor means and pressure sensor means positioned in said outlet channel, and
 (g) feedback means operatively interconnecting each of said flow sensor means and said pressure sensor means with said transducer means, and including switch means for selectively connecting either said flow sensor means or said pressure sensor means to said feedback means, whereby the output of either said flow sensor means or said pressure sensor means acts to control the pressure in said second line and thus positioning of said valve means.

2. The hydraulic flow control valve as defined in claim 1 wherein said transducer means comprises adjustable electrical input means, a nozzle disposed in said first line, and baffle means operatively connected to said electrical input means and movably mounted immediately adjacent said nozzle for controlling the discharge therefrom.

3. The hydraulic flow control valve as defined in claim 2 wherein said first line includes a damping restriction upstream of said nozzle.

4. The hydraulic flow control valve as defined in claim 1 wherein said constant volume flow restriction means comprises
a cylinder,
a control piston slidably mounted in said cylinder,
first input duct means including a metering orifice operatively connected to said inlet channel for delivering hydraulic fluid at a reduced pressure to one side of said piston, second input duct means connected between said input channel and the other side of said piston, spring biasing means disposed in said cylinder for biasing against said one side of said piston, and outlet duct means extending through said cylinder adjacent said one side of said piston to form a control edge therebetween.

5. The hydraulic flow control valve as defined in claim 4 wherein said constant volume flow restriction means further comprises spike means interposed between said spring biasing means and said piston for contacting said piston at a single coaxial point.

6. The hydraulic flow control valve as defined in claim 1 wherein said control means acts to bias said valve means toward said open position, and further including spring biasing means for biasing said valve means toward said closed position.

7. The hydraulic flow control valve as defined in claim 1 further comprising a hydraulic return channel interconnecting said outlet channel and said first line of said control means, and one-way check valve means disposed in said return channel for permitting flow only from said outlet channel toward said first line, to thereby assure a pressure in said first line upon a substantial reduction in the pressure in said inlet channel.

8. The hydraulic flow control valve as defined in claim 7 further comprising a restriction disposed in said return channel.

9. The hydraulic flow control valve as defined in claim 1 wherein said constant volume flow restriction means is operatively connected to said inlet channel to receive hydraulic flow therefrom.

10. A hydraulic flow control valve comprising
a housing having a bore therein,
a hydraulic inlet channel and a hydraulic outlet channel, each communicating with said bore in said housing,
valve means mounted in said bore for movement between a closed position closing communication between said inlet and outlet channels, and an open position permitting such communication,
adjustable control means for biasing said valve means toward one of either its closed or open positions, and including
 (a) constant volume flow restriction means for providing a constant volume hydraulic flow,
 (b) a first line connected downstream of said constant volume flow restriction means,
 (c) adjustable transducer means operatively connected to said first line for maintaining a selected pressure therein,
 (d) an outlet line leading from the downstream side of said transducer means to an external reservoir,
 (e) a second line connected downstream of said constant volume flow restriction means and parallel to said first line, said second line leading to said bore in said housing and so that the pressure in said second line is adapted to bias said valve means toward one of either its closed or open positions,
 (f) flow sensor means positioned in said outlet channel,
 (g) feedback means operatively interconnecting said flow sensor means and said transducer means, whereby the output of said flow sensor means acts to control the pressure in said second line and thus the positioning of said valve means, and
 (h) a hydraulic return channel interconnecting said outlet channel and said first line of said control means, and one-way check valve means disposed in said return channel for permitting flow only from said outlet channel toward said first line, to thereby assure a pressure in said first line upon a substantial reduction in the pressure in said inlet channel.

11. The hydraulic flow control valve as defined in claim 10 wherein said transducer means comprises adjustable electrical input means, a nozzle disposed in said first line, and baffle means operatively connected to said electrical input means and movably mounted immediately adjacent said nozzle for controlling the discharge therefrom.

12. The hydraulic flow control valve as defined in claim 11 wherein said first line includes a damping restriction upstream of said nozzle.

13. The hydraulic flow control valve as defined in claim 10 wherein said constant volume flow restriction means comprises
a cylinder,
a control piston slidably mounted in said cylinder,
first input duct means including a metering orifice operatively connected to said inlet channel for delivering hydraulic fluid at a reduced pressure to one side of said piston,
second input duct means connected between said input channel and the other side of said piston,
spring biasing means disposed in said cylinder for biasing against said one side of said piston, and
outlet duct means extending through said cylinder adjacent said one side of said piston to form a control edge therebetween.

14. The hydraulic flow control valve as defined in claim 13 wherein said constant volume flow restriction means further comprises spike means interposed between said spring biasing means and said piston for contacting said piston at a single coaxial point.

15. The hydraulic flow control valve as defined in claim 10 wherein said control means acts to bias said valve means toward said open position, and further including spring biasing means for biasing said valve means toward said closed position.

16. The hydraulic flow control valve as defined in claim 10 further comprising a restriction disposed in said return channel.

17. The hydraulic flow control valve as defined in claim 10 wherein said constant volume flow restriction means is operatively connected to said inlet channel to receive hydraulic flow therefrom.

* * * * *